Nov. 11, 1969  E. M. ALLEN ET AL  3,477,562
PACKAGE OF COMPACTED MATERIAL
Original Filed Feb. 14, 1964  2 Sheets-Sheet 1
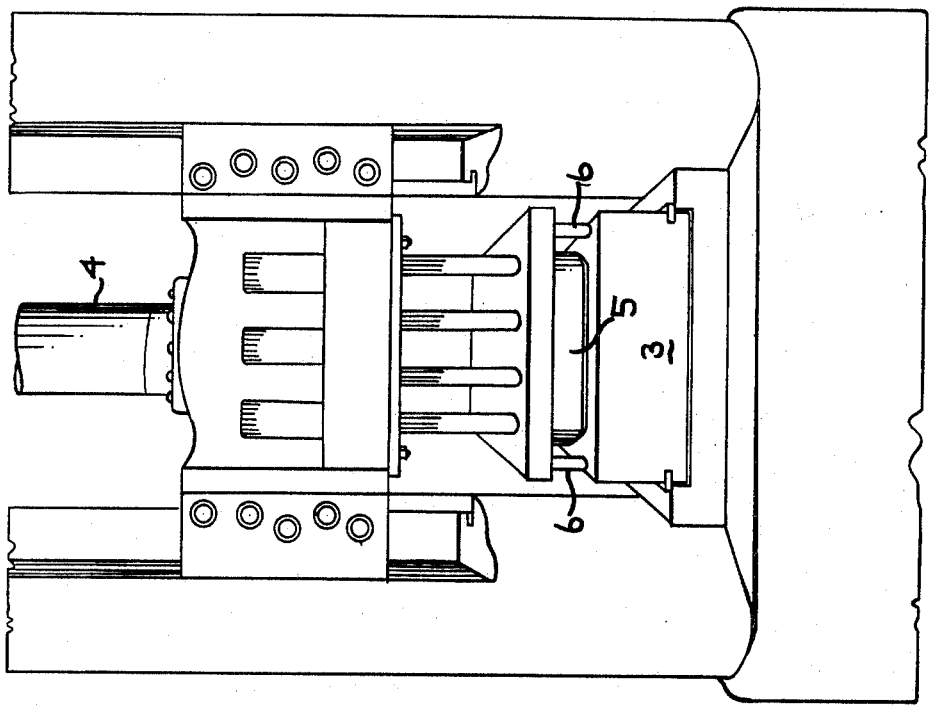
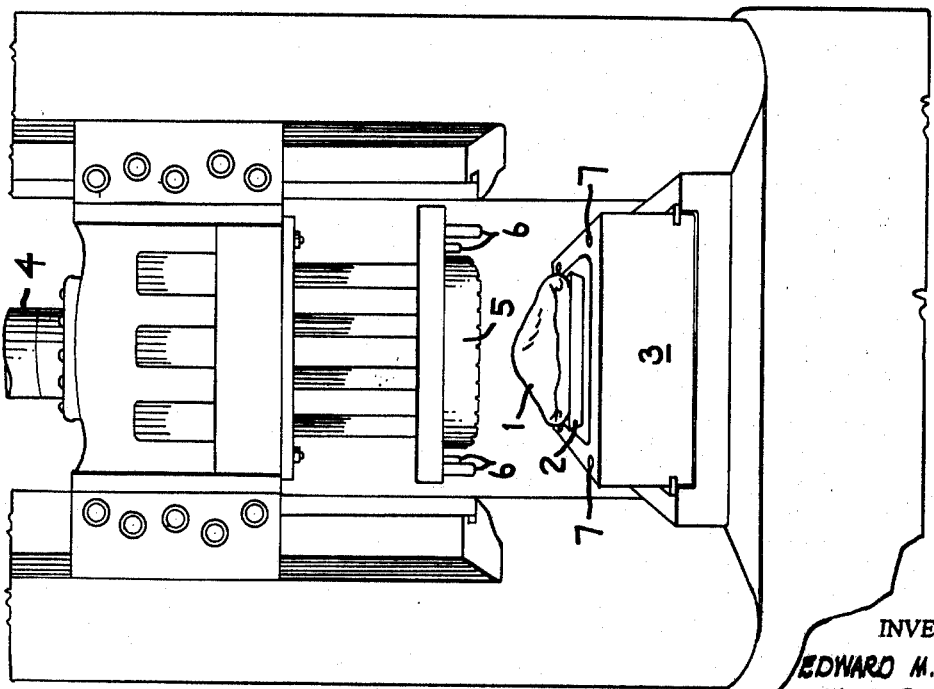
INVENTORS
EDWARD M. ALLEN
CLOYDE G. DYE
JOSEPH A. SMRDEL
BY Chisholm and Spencer
ATTORNEYS Nov. 11, 1969   E. M. ALLEN ET AL   3,477,562
PACKAGE OF COMPACTED MATERIAL
Original Filed Feb. 14, 1964   2 Sheets-Sheet 2

INVENTORS
EDWARD M. ALLEN
CLOYDE G. DYE
JOSEPH A. SMRDEL
BY Chisholm and Spencer
ATTORNEYS

United States Patent Office 3,477,562
Patented Nov. 11, 1969

3,477,562
PACKAGE OF COMPACTED MATERIAL
Edward M. Allen, Doylestown and Cloyde G. Dye, Barberton, Ohio, and Joseph A. Smrdel, Beaumont, Tex., assignors to PPG Industries Inc., Pittsburgh, Pa., a corporation of Pennsylvania
Original application Feb. 14, 1964, Ser. No. 344,964. Divided and this application Apr. 5, 1967, Ser. No. 643,770
Int. Cl. B65d 85/72
U.S. Cl. 206—46          4 Claims

ABSTRACT OF THE DISCLOSURE

A package comprising finely-divided, compacted, siliceous pigment contained in a paper bag such that the bag exerts a compressive force on the pigment, thereby retaining the pigment in its compacted form.

---

Figure 3:
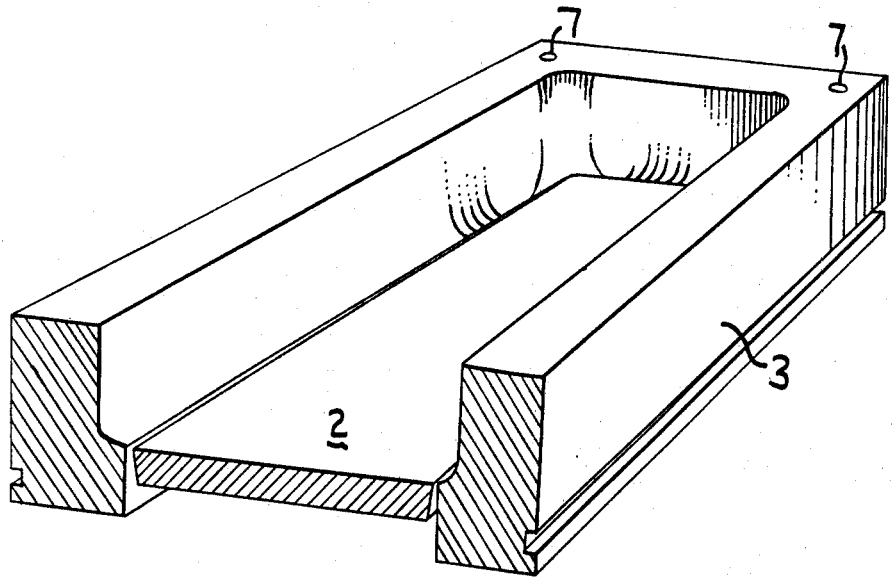

This is a division of Ser. No. 344,964 filed Feb. 14, 1964, now U.S. Patent No. 3,389,529.

This invention relates to providing siliceous pigment material of small average ultimate particle size in compacted form. It more particularly relates to packaging finely divided siliceous pigments with an average ultimate particle size below 1.0 microns to provide a firm package of pigment in compacted form.

A variety of pigment materials is available to industry. Substantial quantities of these pigment materials are consumed annually. The paint, paper and rubber industries, for example, consume many thousands of tons of these materials each year. The most convenient and economical way to handle and transport these large quantities of materials is in bulk. However, bulk handling of undensified finely divided materials normally results in substantial dust losses.

By shipping pigment material in compacted form, e.g., as a solid cake, agglomerate, sinter, or pellets, bulk handling is greatly facilitated. Dust losses are substantially reduced, sometimes essentially eliminated, in this manner. Of course, care must be taken not to densify the pigment too much. Over-compacting destroys desirable properties of many pigment materials.

Many widely used pigments, e.g., carbon black, can be successfully pelletized, compacted, or agglomerated to produce a commercially acceptable material. Such compacted materials are usually easily reduced by mechanical action to ultimate particles or acceptable agglomerations of ultimate particles which possess properties substantially equivalent to the properties of the finely divided pigment material. Such materials can be shipped or handled in bulk with little difficulty.

Those siliceous pigments described in and/or prepared in accordance with the disclosures of U.S. Patents Nos. 2,805,955, 2,940,830, 2,943,970, 3,034,914 or British Patent No. 756,857 the disclosures of which are hereby incorporated by reference are typical of a class of pigments which cannot conveniently be handled in bulk form.

This class of pigments cannot be compacted as readily as most other pigments into an acceptable product. The nature of these pigments is such that when they are compacted sufficiently to withstand the rigors of shipping and bulk handling, they are so tightly compacted that they cannot be conveniently broken up into ultimate particles or acceptable agglomerations thereof. The present invention provides a method of packaging these pigments in densified form so that they are more conveniently and inexpensively shipped and handled. The product produced in accordance with this invention is readily broken into acceptable small particles.

Representative of the pigments densified and packaged in accordance with this invention are those prepared in accordance with U.S. Patent 2,940,830. These pigments are prepared by reacting alkali metal silicate with acid. The surface areas of these products, as measured by the recognized Brunauer-Emmett-Teller test (B.E.T. test), typically range from 75 to 200 square meters per gram. They are very finely divided and have an average ultimate particle size below 0.1 micron, usually about 0.03 micron, as measured by the electron microscope. Products of lower surface area have a particle size in the range of 0.05 to 0.4 micron. These products usually contain in excess of 85 percent silica by weight on an anhydrous basis (free of bound and free water). Metals may be introduced by contacting the silica with an aqueous solution of a salt containing the metal. In that event, the silica concentration may conform to that of a metallic silicate.

U.S. Patent 3,034,914 teaches the preparation of finely divided siliceous pigments, particularly noted for their paper pigmenting properties. These pigments are prepared by precipitating the silica from an aqueous medium having a composition corresponding to that provided by mixing an acid such as hydrochloric acid with sodium silicate or like alkali metal silicate. Characteristic of many of these precipitated products are their considerable degree of uniformity in both ultimate particle size and floc size. Chemically, they are comprised primarily of $SiO_2$ and usually one or more metal oxides, notably an alkaline earth metal oxide, e.g., calcium oxide. As an example, the calcium oxide-silicon dioxide products can be represented on an anhydrous basis by the formula:

$$CaO(SiO_2)_x$$

where $x$ preferably ranges from 5 to 11 including fractional values. The average ultimate particle size of these products is typically less than 1.0 micron, normally from about 0.005 to 0.5 micron. The $SiO_2$ content on an anhydrous basis is at least 50; typically more than about 75 percent by weight. B.E.T. surface area of these pigments ranges from about 30 to about 100 square meters per gram.

The bulk volumes of the aforedescribed siliceous pigments are very large due to their low bulk densities. The bulk densities of such pigments as they are normally packed in a shipping container, e.g., a paper bag, are rarely above 18 pound per cubic foot and are typically in the range of 5 to 12 pounds per cubic foot. Thus, it is difficult to handle and/or ship large quantities of these pigments. Only a few pounds, e.g., 25 to 50 pounds, of this material can be placed in a bag dimensioned to be conveniently handled by two men. Typically, no more than a few, e.g., fewer than 20 tons of this material can be packed in a single standard boxcar.

Even when typical uncompacted siliceous pigments are shipped in bags, a considerable dust loss occurs when the material is introduced into a commercial process, for example, when it is charged in a mixer such as a Banbury mixer in a rubber-making process. It is estimated that from about 5 to about 15 percent of the weight of pigment introduced into such a mixing operation is lost as dust.

Siliceous pigments of the type hereinabove described do not possess desirable dispersion properties, e.g., in a rubber-making process after being compacted or agglomerated sufficiently to withstand the rigors of shipping and handling in bulk. It has been found, however, that these materials may be reduced substantially in volume, i.e., compacted to a bulk density of between 15 to 30 pounds per cubic foot to produce a cake of material with suitable dispersion characteristics. That is, the compacted material is easily broken up by squeezing between the fingers.

U.S. Patent 3,010,791, the disclosure of which is hereby incorporated by reference, describes the properties of certain siliceous pigments compacted to this degree.

Although these siliceous pigments may be compacted to increase substantially their bulk density without impairing their dispersing properties, the resultant compacted cake of material does not possess suitable strength characteristics for bulk handling or shipment. The compacted cake, pellets, or agglomerates crumble into dust when handled or shipped in bulk. Further, the compacted material crumbles upon handling when it is loosely contained in a package or container. The instant invention provides a method whereby finely divided siliceous pigments are provided in compacted form in a firm, easily-handled, rigid package.

According to this invention, a loose package of uncompacted siliceous pigment is pressed in a confined volume such as a mold or die to form a firm package of compacted material. The pigment is compacted to a bulk density which significantly decreases its bulk volume. The pigment is not densified beyond the density at which it is suitable for use, e.g., in the production of rubbery compounds.

The extent to which it is desirable to densify a pigment varies among individuals pigments depending on their individual properties. In general, the pigments contemplated by this invention, i.e., siliceous pigments containing at least 50, typically above 60, often above 80 percent by weight on an anhydrous basis $SiO_2$, with bulk density below 20 pounds per cubic foot, usually between 5 to 18 pounds per cubic foot and average ultimate particle size below 1.0 micron, usually below 0.4 micron, typically between 0.01 and 0.1 micron may be compacted to a significant extent without losing desirable, e.g., dispersion, properties. Thus, the pigments in the packages produced in accordance with this invention may be more than double the bulk density of the uncompacted pigment. Typically the bulk density is increased by from about 5 to about 70, usually about 10 to about 45 percent, basis the uncompacted pigment.

An important aspect of this invention is the production of firm, easily-handled packages. A good package is often obtainable when the bulk density is increased significantly but not sufficiently to decrease the bulk volume of the pigment substantially. What amounts to a significant increase in bulk density with respect to producing a firm package varies among pigments. Usually an increase of about 5 to about 10 percent in bulk density is sufficient to produce a good package.

The finely divided pigment is compacted in its container into strata, cakes, or lumps of substantially uniform bulk density. Of course, there may be minor variations in density throughout the package. The pigment is usually not as densified in the corners of the container, e.g., bag, as in the remainder of the package. An outstanding characteristic of a well-pressed package of pigment is that the densified material exists in a plurality of strata. Of course, the strata are often broken into a plurality of pieces of varying size. The wrapper holds these strata and/or pieces sufficiently tightly together that the package is firm and easy to handle. When the package is opened, the individual strata comprise firm pieces which can be handled without substantial dusting. When introduced into a mixing operation, however, the relatively thin layers or pieces of pigment, e.g., usually than 2, rarely more than 4, typically ⅛ to 2 inches thick, are readily broken into ultimate particles or acceptable agglomerates thereof. Sometimes a single solid cake of compacted material fills substantially the entire volume of the container.

The preferred wrapper for the package contemplated herein is a paper bag. The initial volume of the bag must be sufficient to accommodate the uncompacted loose pigment material. Thus, the initial volume of the bag is considerably, typically at least 5, usually about 10 to 30, rarely more than 40 percent, basis the finished package, larger than the volume of the finished package.

A loosely filled bag of compacted material is difficult to handle and allows the compacted pigment to crumble upon handling. Thus, this invention provides a finished package wherein the compacted pigment snugly fills the entire volume of the bag. Of course, a minor percentage of the internal bag volume at the corners of the bag may not be completely filled. The package material in these corners is preferably forced toward the pigment by rounded surfaces of the confined volume (mold) so that there remains in the bag no significant air space.

The material of the bag is extensible and somewhat elastic. The surface area of the unpressed bag is less than, preferably more than about 1, typically about 2 to about 10, rarely more than 20 percent less than, the surface area of the finished package. In this fashion, the wrapper is flexed or stretched snugly around the compacted pigment in the finished package. Thus, the compacted material is elastically confined by the bag. That is, a compressive force is exerted by the bag on substantially the entire surface of the compacted mass of pigment in the bag. As a result, the package is rigid and firm. Such a package is easily handled. The packages can be roughly handled with no substantial crumbling of the contents.

The preferred material of construction for the bags is extensible kraft paper. Extensible kraft paper has greater elastic properties than natural kraft paper. Bags manufactured from extensible papers such as the one described in U.S. Patent 2,624,245, for example, have given consistently good results. Bags constructed of natural kraft paper have been generally unsatisfactory because they tend to burst as the surface area of the package increases. Of course, this invention is not limited to any particular bag or wrapping material. It is sufficient that the material surrounding the compacted pigment be sufficiently stretchable to avoid bursting when the bag is conformed to the dimensions of the final package. Strong crepe papers produce excellent bags for this invention but are usually prohibitively expensive. The bag material must also be porous to allow air to escape through the bag walls as the volume of the sealed bag is decreased.

In the practice of this invention, a predetermined quantity of pigment is charged to a suitable bag. The bag is placed in the female member of a cavity mold (the die portion of a tool and die). The male member (tool, core, or plunger) of the cavity mold is then brought to bear on the surface of the bag opposite the bottom of the mold; pressure is applied to the bag and its contents by moving the male member toward the bottom of the cavity.

The cavity conforms to the size and shape desired for the finished package. The package will sometimes expand slightly along one or more of its dimensions when removed from the cavity. This expansion sometimes results in a corresponding shortening along one or more of its other dimensions. Thus, the dimensions of the cavity may actually differ slightly from those of the finished package. These differences rarely exceed ¼ to ½ inch and are dependent on the particular pigment being densified. The bag is most conveniently placed in the cavity such that its shortest dimension (thickness) reposes vertically to the bottom of the cavity. The walls of the cavity are usually substantially vertical. The walls may be inclined so that the cross section of the top of the mold is slightly oversize as an aid to the escape of air.

Sufficient weight of pigment is placed in the bag that when it is pressed to the volume of the cavity mold, with the core in its down or closed position, the resultant cake will have the requisite bulk density. I.e., the compacted or pressed pigment is significantly reduced over the unpressed pigment in bulk volume but retains suitable commercial properties, e.g., rapid dispersion in standard mixing procedures. The dimensions required for a mold are usually calculated from the volume occupied by a given standard weight (typically 25, 50 or 100 pounds) of a particular pigment compacted to a predetermined bulk density. Different pigments obviously possess different bulk densities when compacted to a given volume. In addition, the bulk density to which a given pigment is advantageously compacted is usually unique to that pigment.

An important aspect of this invention is the correct correlation of the bag dimensions with the dimensions of the confined volume (mold). The dimensions chosen for the mold depend upon the weight and properties of the pigment being packaged. The initial length and width dimensions of the bag are preferably less than the corresponding interior dimensions of the cavity. The invention is operable if only one such dimension differs from the corresponding dimension of the cavity. The thickness of the bag is ordinarily greater than the thickness of the finished package (depth of the closed mold) to provide sufficient bag volume to accommodate the loose pigment material. The length and width of the unpressed bag should be sufficient that when the bag is conformed to the interior dimensions of the mold, the material of the bag walls does not exceed its bursting point.

The mold dimensions, i.e., cross sectional area and depth are chosen to provide the desired amount of surface area for a given volume. Thus, the surface area per unit volume of the finished package increases as the depth of the mold is decreased and the horizontal cross-section area is increased.

Pressure can be applied to the bag in any convenient manner. The preferred method is to attach the male member (core) of the cavity mold to the ram of a hydraulic press. The female member or cavity is rigidly fixed in opposition to the ram so that as the ram is forced downward by hydraulic pressure, the core moves toward the bottom of the cavity.

Figure 4:
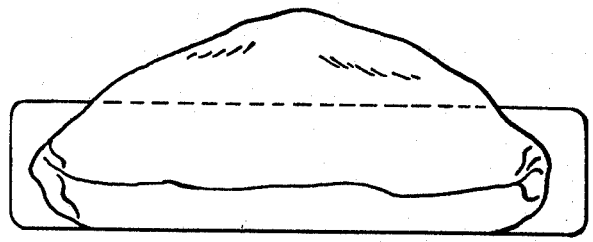

FIGURE 1 depicts a typical cavity mold and hydraulic press arrangement with the two members of the cavity mold in open position. A filled, unpressed bag is positioned on an ejection plate. FIGURE 2 shows the same arrangement in closed, fully-pressed position. FIGURE 3 shows a cut-away view of the female member of the mold with the ejection plate dropped to the bottom of the cavity. FIGURE 4 compares the size and contour of an unpressed bag with the size and contour of a pressed bag. Similar reference numerals in the several drawings refer to similar elements.

As illustrated by FIGURE 1 of the drawings, a filled unpressed bag 1 is placed on the ejection plate 2 of the female member of cavity 3 of the cavity mold. The ejection plate has been found desirable, often essential, to remove a fully pressed bag from the cavity. The interior surfaces of the cavity, especially the walls thereof, are preferably coated with a smooth material, such as polished chrome or Teflon, to reduce friction between the bag wall and the cavity. The ejection plate should bear against substantially the entire under surface of the bag to reduce the likelihood of tearing the bag. Thus, the ejection plate preferably comprises essentially the entire bottom of the cavity. It is usually convenient to construct the equipment so that the ejection plate is forced up through the cavity as the ram 4 lifts the core 5 to open position. In this fashion, the fully pressed bag is raised to a position where it is easily slid off the ejection plate.

After a bag is placed on the ejection plate 2, the core 5 is lowered in the direction of the bag. Preferably, ejection plate 2 is caused to drop to the bottom of the cavity 3 as the ram 4 pushes the core 5 downward. Thus in the preferred embodiment of this invention, plate 2 is in lower most position, as illustrated by FIGURE 3, before the bag 1 is contacted by the core 5. After the plate has come to rest at the bottom of the cavity, the core continues to move downward thereby applying pressure to the bag.

FIGURE 2 shows the core in its most downward position. The core 5 preferably descends part way into the cavity. In this fashion, all surfaces of the bag are confined by the internal surfaces of the mold. Guide rods 6 fit into receiving holes 7 (shown in FIGURE 1) properly to align and guide the core thereby preventing the core from "freezing" in or marring the interior of the cavity.

Usually, the pressure on the bag is initially increased rapidly, i.e., in ½ to 2 seconds to a low level, i.e., 50 to 150 p.s.i.g. immediately upon contact of the core with the bag.

The pressure is then increased uniformly over a period of several seconds to the required maximum pressure. The faster the pressure is increased, the more economical the operation. It has been found, however, that if the pressure is increased too rapidly, free air is left entrapped in the bag after it has been removed from the mold. "Free air" is air not physically entrapped or held by the pigment after it has been compacted. Increasing the porosity of the bag does not greatly increase the rate at which pressure can be applied to the bag. It is thought that a substantial quantity of air is held in association with the pigment. It has been found that a certain minimum time is required, e.g., about 10 to about 20 seconds for the application of pressure to allow most of the free air to escape from the pigment and through the bag walls. The time required varies among individual pigments.

The ultimate pressure to be applied to the bag varies from pigment to pigment. It must be sufficient to compact the pigment to the desired bulk density. Too much pressure will over-compact some pigments; ultimate pressures required rarely exceed 1000 p.s.i. and are typically between 200 and 700 p.s.i. rarely below 50 to 100 p.s.i.

It has been found that good results are obtained if the ultimate pressure is maintained for a period as low as 05 seconds, preferably about 1 to about 5 seconds. Generally, holding this pressure for greater periods of time does not affect the quality of either the package or the product. The invention will be more completely understood with reference to the following specific examples:

Example 1

Fifty pounds of silica pigment was charged to a bag. The silica pigment had the following approximate chemical composition and properties:

| | | |
|---|---|---|
| $SiO_2$ | Percent by weight | 88.0 |
| NaCl | do | 1.0 |
| CaO | do | 0.5 |
| $Al_2O_3$ | do | 1.0 |
| $Fe_2O_3$ | do | 1.5 |
| Free water | do | 6.0 |
| Bound water | do | 2.0 |
| Surface area | Square meters per gram | 140–160 |
| Bulk density | Pound per cubic foot | 13 |
| Average ultimate particle size | micron | 0.015 |

The bag was constructed of 3 plys of 50-pound extensible kraft paper. When empty and laid flat the bag measured 23 inches by 38 inches. The bag measured 5½ inches across the gusset.

The effective size of the filled bag on a pallet, i.e., the dimensions of the volume required by such a bag when a number of the bags were stacked on a pallet was 18 inches by 38½ inches by 7¾ inches. All of the edges of a filled bag are normally rounded. Thus, a bag was shaped into a package with square corners to facilitate measuring its surface area. The squared package measured about 16¼ inches by 36 inches by 8¼ inches and had a surface area of about 2032 square inches.

The volumes of several filled bags were determined by a standard water displacement technique. Their average volume was determined to be slightly in excess of 3 cubic feet.

Filled bags were pressed in an apparatus, i.e., cavity mold and hydraulic press such as illustrated in the drawings. The press had a capacity of 350 tons.

The walls of the cavity were substantially vertical so the dimensions of the cross section of the cavity were identical along its entire depth. The internal dimensions of the cavity were about 39¾ inches by about 19½ inches.

The dimensions of the ejection plate (the internal surface of the bottom of the mold) were about 36 inches by about 16 inches. The ejection plate in closed position seated snugly in an opening at the bottom of the cavity. The dimensions of the core of the mold were about 12 thousandths of an inch smaller in each cross sectional direction than the cavity. All corners and edges which would contact the bag were rounded or filleted to appropriate radii.

The depth of the open mold, i.e., with the plunger raised and the ejection plate seated at the bottom of the cavity was slightly in excess of 4½ inches.

The interior of the cavity, i.e., the walls and upper surface of the ejection plate were plated with a 0.001 inch thickness of chrome to reduce friction. The pressing surface of the core was grooved to facilitate the escape of air from the bag. Air left the cavity through a series of ducts communicating with the grooves and passing through the core to the atmosphere.

The pressing operation was accomplished by first positioning a filled bag on the ejection plate. The ram of the press and the ejection plate were then lowered until the plate was seated in the bottom of the cavity. Thus, the bag rested in the cavity and was positioned in about the center of the cavity bottom.

Pressure was applied to the bag by further lowering the ram of the press thereby forcing the core of the mold into the cavity. Several bags were pressed at various maximum pressures and over various cycle times as shown in the following table. The cycle time starts with lowering the bag into the cavity and ends with the ejection plate pushing the bag out of the cavity. In each run, approximately one second was required to drop the bag into the cavity. During the second second of the cycle, the pressure applied to the bag was rapidly increased to about 100 p.s.i.g. The pressure was then increased at a uniform rate (column 2) to a maximum pressure (column 3) and held for a few seconds (column 4). The pressure was released almost instantaneously about one second before the end of the cycle and the filled bag was ejected during the last second.

| (1) Run: | (2) Time to increase from 100 p.s.i.g. to maximum pressure, seconds | (3) Maximum pressure | (4) Retention time, seconds | (5) Total cycle time, seconds | (6) Bulk density of pressed pigment |
|---|---|---|---|---|---|
| 1 | 15 | 200 | 30 | 48 | 18.1 |
| 2 | 15 | 200 | 2 | 20 | 17.9 |
| 3 | 15 | 300 | 30 | 48 | 19.5 |
| 4 | 15 | 300 | 2 | 20 | 19.6 |
| 5 | 5 | 600 | 2 | 10 | 20.4 |
| 6 | 10 | 600 | 2 | 15 | 20.7 |
| 7 | 15 | 600 | 2 | 20 | 20.6 |
| 8 | 20 | 600 | 2 | 25 | 20.6 |
| 9 | 5 | 800 | 2 | 10 | 21.4 |
| 10 | 15 | 800 | 2 | 20 | 21.5 |

Runs 1 and 2 did not sufficiently compact the pigment. When the bags were opened it was found that less than 50 percent of the pigment had caked. The run 1 product did not differ substantially from that produced in run 2. The run 4 product was slightly better than that of runs 1 and 2. Run 3 produced an acceptable product with up to 90 percent of the pigment in the bag in caked or compacted form. Runs 5 through 10 all resulted in the compaction of substantially all of the material in the bags. Runs 5, 6, and 9, however, produced sloppy bags because free air remained entrapped in the bag, primarily between the cake of pigment and the bag walls.

Run 7 obviously represents the most economical pressing cycle of those tested which will produce a superior product. Runs 7, 8, and 10 all produced good compacted product in a firm package 39½ inches by 19½ inches by 5 inches. The surface area of the packages were thus about 2132 square inches, about 100 square inches in excess of the surface area of the unpressed bag. The average volumes of the pressed bag were determined to be slightly less than 2¼ cubic feet. The bulk density of the pressed pigments resulting from the various runs are given in column 6.

Example 2

The procedure of Example 1 was repeated with a silica pigment of the following approximate composition:

| | | |
|---|---|---|
| $SiO_2$ | percent by weight | 80 |
| NaCl | do | 1 |
| CaO | do | 6 |
| $Al_2O_3$ | do | 0.5 |
| $Fe_2O_3$ | do | 0.1 |
| Free water | do | 5.0 |
| Bound water | | Remainder |
| Surface area | square meters per gram | 40 |
| Bulk density | pounds per cubic foot | 16 |
| Ultimate particle size | micron | 0.08 |

Seventy pounds of this material was placed in a bag constructed as in Example 1 but measuring 34 inches by 25 inches by 5½ inches (gusset). An unpressed filled bag measured 35 inches by 19½ inches by 7⅞ inches, had a surface area of 2055 square inches and an average volume of slightly more than 2.95 cubic feet.

The bags were placed in a mold similar to that of Example 1 to produce a firm package 36½ inches by 22 inches by 5⅜ inches, a surface area of 2238 square inches and a volume of slightly less than 2.5 cubic feet.

This pigment is much more compressible than that of Example 1. Thus, it was found that a good firm package of compacted pigment was obtained by pressing the bag to an ultimate pressure of 300 to 400 p.s.i.g. Pressing cycles of 15 to 25 seconds produced good firm packages. The product obtained had a bulk density in excess of 30 pounds per cubic foot.

Example 3

In the mold and bag of Example 1, a pigment of the following approximate composition was pressed:

| | | |
|---|---|---|
| $SiO_2$ | percent by weight | 62 |
| NaCl | do | 1 |
| CaO | do | 16 |
| $Al_2O_3$ | do | 0.5 |
| $Fe_2O_3$ | do | 0.1 |
| MgO | do | 0.1 |
| Free water | do | 5 |
| Bound water | do | 10 |
| Surface area | square meters per gram | 90 |
| Bulk density | pounds per cubic foot | About 12 |
| Average ultimate particle size | micron | 0.030 |

The size of the finished pressed package was 40 inches by 20 inches by 4¾ inches. It was found that the dispersion properties of this pigment was adversely affected if pressed at above 300 p.s.i.g. A firm package of pigment with bulk density between 18 and 19 pounds per cubic foot was produced when the ultimate pressure was held to between 200 and 250 p.s.i.g. Good results were obtained with pressing cycles of about 15 seconds.

Example 4

Fifty pounds of pigment prepared by reacting solutions of aluminum sulphate and sodium silicate in accordance with U.S. Patents 2,739,073 and 2,848,346 was packed in an extensible paper bag 34 inches by 19 inches by 8¼ inches.

The pigment had the following approximate composition:

| | | |
|---|---|---|
| $SiO_2$ | percent by weight | 64.6 |
| Total Na (reported as $NaO_2$) | do | 7.9 |
| CaO | do | 0.1 |
| $Al_2O_3$ | do | 12.1 |
| $Fe_2O_3$ | do | 0.2 |
| $Na_2SO_4$ | do | 5.5 |
| Free water | do | 6.0 |
| Bound water | do | 7.6 |
| Surface area | square meters per gram | 90 |
| Bulk density | pounds per cubic foot | About 16.2 |
| Average ultimate particle size | micron | 0.024 |

The bag was compressed in accordance with the procedure of Example 1 to an ultimate pressure of 500 pounds per square inch to produce a package 37 inches by 22 inches by 4½ inches. The bulk density of the pressed pigment was 23½ pounds per cubic foot. The pressing cycles used were in excess of 20 seconds. Higher ultimate pressures were found to further densify the pigment without adversely affecting its dispersion properties.

Although the present invention has been described with reference to specific details and detailed embodiments thereof, it is not intended that such details be regarded as limitations upon the scope of this invention except insofar as they are included in the accompanying claims.

We claim:
1. A shaped package comprising finely divided siliceous pigment with an average ultimate particle size below one micron, compacted to a bulk density of between 5 and 100 percent greater than the bulk density of said pigment in uncompacted form firmly held in an extended paper bag, said bag exerting sufficient compressive force on the pigment to maintain compaction and shape and to prevent crumbling during handling of the package.

2. The package of claim 1 wherein the bulk density of the compacted pigment is between 5 and 20 percent greater than the bulk density of the uncompacted pigment.

3. The package of claim 1 in which the compacted bulk density is in the range of 10–45 percent greater than the bulk density of the pigment before compaction.

4. The package of claim 1 in which the compacted bulk density of the siliceous pigment is between 15 and 30 pounds per cubic foot.

References Cited
UNITED STATES PATENTS

| | | | |
|---|---|---|---|
| 2,780,247 | 2/1957 | Claassen | 53—22 |
| 2,624,245 | 1/1953 | Cluett | 162—100 |
| 2,682,216 | 6/1954 | Shields | 53—124 |
| 2,907,447 | 10/1959 | Offutt et al. | 53—124 |
| 2,940,830 | 6/1960 | Thornhill | 23—182 |

WILLIAM T. DIXSON, JR., Primary Examiner

U.S. Cl. X.R.

53—24